United States Patent
Masunaga et al.

(10) Patent No.: US 12,509,551 B2
(45) Date of Patent: Dec. 30, 2025

(54) POLYARYLETHERKETONE RESIN COMPOSITION, FIBER-REINFORCED RESIN BASE MATERIAL, AND FORMED PRODUCT

(71) Applicant: TORAY INDUSTRIES, INC., Tokyo (JP)

(72) Inventors: Atsushi Masunaga, Nagoya (JP); Kenji Ishitake, Nagoya (JP); Nobuyuki Tomioka, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 579 days.

(21) Appl. No.: 17/636,399

(22) PCT Filed: Sep. 11, 2020

(86) PCT No.: PCT/JP2020/034417
§ 371 (c)(1),
(2) Date: Feb. 18, 2022

(87) PCT Pub. No.: WO2021/054250
PCT Pub. Date: Mar. 25, 2021

(65) Prior Publication Data
US 2022/0389161 A1 Dec. 8, 2022

(30) Foreign Application Priority Data
Sep. 20, 2019 (JP) .................. 2019-171870

(51) Int. Cl.
*C08G 65/40* (2006.01)
*C08J 5/04* (2006.01)
(Continued)

(52) U.S. Cl.
CPC .......... *C08G 65/4012* (2013.01); *C08J 5/243* (2021.05); *C08K 5/098* (2013.01); *C08K 5/18* (2013.01);
(Continued)

(58) Field of Classification Search
None
See application file for complete search history.

(56) References Cited

U.S. PATENT DOCUMENTS 4,963,627 A * 10/1990 Smyser .................. C08L 79/08
524/439
5,180,764 A 1/1993 Nagasaki et al.
(Continued)

FOREIGN PATENT DOCUMENTS

| CN | 103319876 A | 9/2013 |
| JP | 64-66266 A | 3/1989 |

(Continued)

OTHER PUBLICATIONS

International Search Report, issued in PCT/JP2020/034417, PCT/ISA/210, dated Nov. 17, 2020.
(Continued)

*Primary Examiner* — Ha S Nguyen
(74) *Attorney, Agent, or Firm* — Birch, Stewart, Kolasch & Birch, LLP (57) ABSTRACT

The objective of the present invention is to provide a polyarylketone resin composition, a fiber-reinforced resin base material, and formed products therefrom having excellent thermal stability and mechanical properties. In order to achieve the above objective, the present invention has the following constitution. That is, the polyaryletherketone resin composition comprises (A) a polyaryletherketone and (B) a transition metal compound, wherein the transition metal content is between 0.001 parts by mass and 4 parts by mass (Continued)

inclusive with respect to 100 parts by mass of (A) the polyaryletherketone.

9 Claims, 2 Drawing Sheets

(51) Int. Cl.
    *C08J 5/24*           (2006.01)
    *C08K 3/22*           (2006.01)
    *C08K 5/098*         (2006.01)
    *C08K 5/17*           (2006.01)
    *C08K 5/18*           (2006.01)
    *C08K 7/02*           (2006.01)
    *C08K 7/06*           (2006.01)
    *C08L 71/00*         (2006.01)
    *C08L 71/08*         (2006.01)
(52) U.S. Cl.
    CPC ............ *C08K 7/06* (2013.01); *C08G 2650/40* (2013.01); *C08J 2371/10* (2013.01)

(56) References Cited

U.S. PATENT DOCUMENTS

| 2009/0036632 | A1* | 2/2009 | Hida ................ C07C 311/16 |
| | | | 528/172 |
| 2013/0261229 | A1* | 10/2013 | Sano ................ C08L 87/00 |
| | | | 523/435 |
| 2016/0264740 | A1 | 9/2016 | Imai et al. |
| 2017/0145208 | A1* | 5/2017 | Lu ........................ C08L 61/16 |

FOREIGN PATENT DOCUMENTS

| JP | 2-227458 | A | | 9/1990 |
| JP | 3-292369 | A | | 12/1991 |
| JP | 2007-197715 | A | | 8/2007 |
| JP | 2015-110747 | A | | 6/2015 |
| JP | 2015178612 | A | * | 10/2015 |
| JP | 2018-9115 | A | | 1/2018 |
| JP | 2018009115 | A | * | 1/2018 |

OTHER PUBLICATIONS

Written Opinion of the International Searching Authority, issued in PCT/JP2020/034417, PCT/ISA/237, dated Nov. 17, 2020.

\* cited by examiner

POLYARYLETHERKETONE RESIN COMPOSITION, FIBER-REINFORCED RESIN BASE MATERIAL, AND FORMED PRODUCT

TECHNICAL FIELD

The present invention relates to a polyaryletherketone resin composition, a fiber reinforced plastic base, and a molded article.

BACKGROUND ART

Polyaryletherketone is one of the representative super engineering plastics having excellent properties such as heat resistance, chemical resistance, flame retardance, sliding property, and friction wear characteristics. Polyaryletherketone has been widely applied to mechanical parts, automobile parts, aviation parts, electrical and electronic parts and the like due to excellent physical properties thereof. The demand for polyaryletherketones has been increasing in applications in fields where use conditions are extremely severe and as a substitute material for metals, and improvement in heat stability and mechanical properties has been required.

As means for improving the heat stability of polyaryletherketone, Patent Document 1 discloses that a polyaryletherketone resin composition having high heat stability is obtained by blending a phosphate with a polyaryletherketone resin. Patent Document 2 discloses that when a polyaryletherketone resin contains an organic compound having a base constant of 2 to 12 and a boiling point of higher than 300° C., a polyaryletherketone resin composition having high heat stability is obtained.

As means for improving the mechanical properties of the polyaryletherketone resin, Patent Document 3 discloses that a polyaryletherketone resin composition excellent in the mechanical properties is obtained by blending a polyetherimide resin and fine talc in a polyaryletherketone resin.

As means for improving heat stability of a thermoplastic resin, Patent Document 4 discloses that a metal halide or metal carboxylate of metal selected from copper, nickel, tin, and cerium is blended in a blend of a polyphenyleneether resin and a polyamide resin, and thereby the thermoplastic resin is excellent in heat stability.

PRIOR ART DOCUMENTS

Patent Documents

Patent Document 1: Japanese Patent Laid-open Publication No. 2018-520257
Patent Document 2: Japanese Patent Laid-open Publication No. 4-224862
Patent Document 3: Japanese Patent Laid-open Publication No. 2007-197715
Patent Document 4: Japanese Patent Laid-open Publication No. 1-163262

SUMMARY OF THE INVENTION

Problems to be Solved by the Invention

In the methods proposed in Patent Documents 1 and 2, a polyaryletherketone resin composition having high heat stability can be obtained, but there is a problem in the heat stability under a more severe environment. The method proposed in Patent Document 3 has a problem in the heat stability although an effect of improving the mechanical properties can be obtained. In the method proposed in Patent Document 4, a sufficient heat stability improving effect cannot be obtained with a polyaryletherketone resin.

An object of the present invention is to solve the problems in the related art and to provide a polyarylketone resin composition, a fiber reinforced plastic base, and a molded article thereof having excellent heat stability and mechanical properties.

Solutions to the Problems

The present invention has been achieved as a result of studying the solution of the problems in the related art described above as an object, and has the following configuration.

[1] A polyaryletherketone resin composition containing a polyaryletherketone (A) and a transition metal compound (B), wherein a transition metal content is 0.001 parts by mass or more and 4 parts by mass or less based on 100 parts by mass of the polyaryletherketone (A).
[2] The polyaryletherketone resin composition according to [1], wherein the transition metal compound (B) is a compound of a group 10 element of a periodic table.
[3] The polyaryletherketone resin composition according to [1] or [2], wherein a complete decomposition temperature of the transition metal compound (B) is equal to or lower than a melting point of the polyaryletherketone (A).
[4] The polyaryletherketone resin composition according to any one of [1] to [3], wherein the complete decomposition temperature of the transition metal compound (B) is 25° C. or higher and 300° C. or lower.
[5] The polyaryletherketone resin composition according to any one of [1] to [4], containing a multivalent amine (D) in an amount of 0.01 parts by mass or more and 5 parts by mass or less with respect to 100 parts by mass of the polyaryletherketone (A).
[6] The polyaryletherketone resin composition according to any one of [1] to [5], containing a fibrous filler (E) in an amount of 10 parts by mass or more and 400 parts by mass or less with respect to 100 parts by mass of the polyaryletherketone (A).
[7] A fiber reinforced plastic base obtained by impregnating a continuous fibrous filler (E) or a reinforcing fiber base in which a discontinuous fibrous filler (E) is dispersed with the polyaryletherketone resin composition according to any one of [1] to [5].
[8] A molded article obtained by molding the polyaryletherketone resin composition according to any one of [1] to [6] or the fiber reinforced plastic base according to [7].

Effects of the Invention

According to the present invention, it is possible to obtain a polyaryletherketone resin composition, a fiber reinforced plastic base, and a molded article thereof having excellent heat stability and mechanical properties.

EMBODIMENTS OF THE INVENTION

The polyaryletherketone resin composition of the present invention contains a polyaryletherketone (A) and a transition metal compound (B).

<Polyaryletherketone (A)>

The polyaryleneether ketone (A) used in the present invention is not particularly limited as long as it is a thermoplastic resin having a repeat unit in which an aryl group is bonded by an ether group and a ketone group, and is preferably a polymer having units of the following General Formula (Ia) and General Formula (Ib).

[Chem. 1]

(Ia)

(Ib)

Here, $Ar^1$ and $Ar^2$ each represent an arylene group. $Ar^1$ and $Ar^2$ may be the same as or different from each other. $Ar^1$ and $Ar^2$ are each independently preferably one or more arylene groups selected from the group consisting of 1,3-phenylene, 1,4-phenylene, 4,4'-biphenylene, 1,4-bis(4-phenoxybenzoyl) phenylene, 1,4-naphthylene, 1,5-naphthylene, 2,6-naphthylene, and anthracenylene. X represents an electron-withdrawing group. X is preferably one or more groups selected from the group consisting of a carbonyl group and a sulfonyl group. Y is one or more groups selected from the group consisting of an oxygen atom, a sulfur atom, and an alkylene group. Y is preferably one or more groups selected from the group consisting of —$CH_2$—, isopropyridene, and hexafluoroisopropyliden.

In these structural units, preferably at least 50 mol % of X and more preferably at least 70 mol % of X are a carbonyl group. Furthermore, preferably at least 50 mol % of Y and more preferably at least 70 mol % of Y are oxygen atoms.

Examples of the polyaryletherketone include polyetheretherketone having a structural unit of the following formula (II) and/or a structural unit of the following formula (III), polyetherketone having a structural unit of the following formula (IV), polyetherketoneketone having a structural unit of the following formula (V) and/or a structural unit of the following formula (VI), polyetheretherketoneketone having a structural unit of the following formula (VII), and polyetherketoneetherketoneketone having a structural unit of the following formula (VIII). These can be used alone or in combination of two or more kinds thereof.

[Chem. 2]

(II)

(III)

(IV)

(V)

(VI)

(VII)

(VIII)

The polyaryletherketone is not particularly limited, and for example, polyaryletherketones put on the market as "VESTAKEEP (registered trademark)" produced by Daicel-Evonik Ltd., "VICTREX (registered trademark)" produced by Victrex plc., "KEPSTAN (registered trademark)" produced by Arkema S. A., "AvaSpire (registered trademark)", "KetaSpire (registered trademark)" or "NovaSpire (registered trademark)" produced by Solvay Specialty Polymers Italy S.p.A, and the like can also be obtained and used.

<Transition Metal Compound (B)>

The transition metal compound used in the present invention is not particularly limited as long as it is a compound of a transition metal.

The transition metal does not have a closed shell in a d orbital or an f orbital unlike a typical element, and can stably hold an unpaired electron, and thus has a property of easily taking a coordinate bond. The transition metal which easily forms a coordinate bond is preferable because a polyaryletherketone resin composition having excellent heat stability and mechanical properties can be obtained. As the transition metal that easily forms a coordinate bond, a transition metal having a smaller ionic radius is more likely to form a coordinate bond, which is preferable. Specific examples of the transition metal having a small ionic radius include ruthenium, rhodium, technetium, molybdenum, iridium, osmium, rhenium, tungsten, tantalum, hafnium, zirconium, zinc, copper, nickel, cobalt, iron, chromium, and manganese.

The reason why the polyaryletherketone resin composition of the present invention exhibits the excellent heat stability and mechanical properties is not necessarily clear, but can be presumed as follows. When the polyaryletherketone (A) is heated at a temperature equal to or higher than the melting point in the presence of oxygen, a proton on an aromatic ring is extracted by an active oxygen radical to generate a phenyl radical, and a crosslinking reaction excessively proceeds from the phenyl radical as a starting point. Therefore, the heat stability is poor, and the mechanical properties are also poor. Here, it can be presumed that by coordinating a transition metal having a high coordinative bonding ability on the aromatic ring, proton abstraction can be suppressed, and a polyaryletherketone resin composition having suppressed crosslinking, that is, the excellent heat stability and mechanical properties can be obtained. In addition, it can be presumed that when the transition metal is coordinated on the aromatic ring of the polyaryletherketone (A), the molecular chains are connected by a coordinate bond, and appropriately crosslinked polyaryletherketone can be obtained, and the mechanical properties can be further improved.

On the other hand, when the polyaryletherketone resin composition contains an alkali metal compound (C) in the same metal content instead of the transition metal compound (B) having a transition metal content of 0.001 parts by mass or more and 4 parts by mass or less with respect to 100 parts by mass of the polyaryletherketone (A), the polyaryletherketone resin composition has weak coordinative bonding ability and cannot be coordinated on the aromatic ring of the polyaryletherketone, and thus a polyaryletherketone resin composition excellent in the heat stability and the mechanical properties cannot be obtained. Here, examples of the alkali metal compound (C) include salts of alkali metals selected from lithium, sodium, potassium, rubidium, cesium, and francium. Specific examples thereof include salts of alkali metal such as a carboxylate salt, a halide salt, a phosphate salt, a carbonate salt, a hydroxide salt, an oxide salt, a sulfide salt, an acetylacetonate complex salt, and an alkoxide salt.

In the polyaryletherketone resin composition of the present invention, the transition metal compound (B) is preferably a compound of a group 10 element of the periodic table. This is because the group 10 element of the periodic table is rich in electrons, and therefore easily undergo oxidative addition, that is, coordinate bond. Among these, nickel is most preferable because of its small ionic radius.

Examples of the transition metal compound (B) include metal salts such as a carboxylate salt, a halide salt, a carbonate salt, a hydroxide salt, an oxide salt, a sulfide salt, an acetylacetonate complex salt, and an alkoxide salt of the transition metal. Examples of the carboxylic acid include formic acid, acetic acid, propionic acid, butyric acid, stearic acid, lactic acid, oleic acid, benzoic acid, oxalic acid, malonic acid, succinic acid, glutaric acid, and adipic acid. Examples of the alkoxide include butoxide, propoxide, ethoxide, and methoxide. From the viewpoint that a transition metal compound having a low complete decomposition temperature is preferable, carboxylate is preferable, and among the carboxylates, formic acid and acetic acid are more preferable, and formic acid is still more preferable.

In the polyaryletherketone resin composition of the present invention, the complete decomposition temperature of the transition metal compound (B) is preferably equal to or lower than the melting point of the polyaryletherketone (A). When the complete decomposition temperature of the transition metal compound (B) is equal to or lower than the melting point of the polyaryletherketone (A), the transition metal is reduced to a zero-valent transition metal by heating the polyaryletherketone resin composition of the present invention at a temperature equal to or higher than the melting point of the polyaryletherketone (A). This zero-valent transition metal has strong activity and is likely to cause a coordinate bond by oxidative addition, which is preferable. The complete decomposition temperature of the transition metal compound (B) is more preferably −30° C. or lower, and still more preferably −70° C. or lower of the melting point of the polyaryletherketone (A).

In the polyaryletherketone resin composition of the present invention, the complete decomposition temperature of the transition metal compound (B) is preferably 25° C. or higher and 300° C. or lower. When the complete decomposition temperature of the transition metal compound (B) is 25° C. or higher, the transition metal compound is hardly oxidized, so that the transition metal compound hardly becomes an inert oxidation transition metal. The complete decomposition temperature of the transition metal compound (B) is preferably 100° C. or higher, and more preferably 150° C. or higher. In addition, when the complete decomposition temperature of the transition metal compound (B) is 300° C. or lower, the transition metal is easily reduced when the polyaryletherketone resin composition is heated, and a coordinate bond is easily generated by oxidative addition, which is preferable. The complete decomposition temperature of the transition metal compound (B) is more preferably 270° C. or lower.

In the polyaryletherketone resin composition of the present invention, the complete decomposition temperature of the transition metal compound (B) is preferably equal to or lower than the melting point of the polyaryletherketone (A), and more preferably 25° C. or higher and 300° C. or lower.

The complete decomposition temperature refers to a temperature at which substantially most parts of the compound except for the transition metal in the transition metal compound is desorbed or completely decomposed from the transition metal. This temperature is measured by a method in which a transition metal compound is weighed into a container, and a mass change is measured while the temperature is raised at a constant rate in an inert gas atmosphere using a thermogravimetric analysis device. A thermal reduction rate is measured while the temperature of the transition metal compound is raised under a nitrogen atmosphere, and the complete decomposition temperature is defined as a temperature at which the weight loss does not proceed any more. As the temperature at which the weight loss does not proceed any more, a temperature at which a weight loss rate reaches 90% of the weight of the compound component excluding the transition metal of the transition metal compound is used for determination of the complete decomposition temperature.

The melting point of the polyaryletherketone (A) can be measured by a differential scanning calorimetry.

In the polyaryletherketone resin composition of the present invention, the transition metal content is 0.001 parts by mass or more and 4 parts by mass or less with respect to 100 parts by mass of the polyaryletherketone (A). The transition metal content is preferably 0.01 parts by mass or more and 2 parts by mass or less, and more preferably 0.1 parts by mass or more and 1 part by mass or less. When the transition metal content is less than 0.001 parts by mass, it is difficult to obtain an excellent thermal stabilization effect. When the transition metal content is more than 4 parts by mass, aggregation of the transition metal compound (B) is likely to occur, and excellent thermal stabilization effect and mechanical properties cannot be obtained.

The total content of the polyaryletherketone (A) and the transition metal in the polyaryletherketone resin composition of the present invention is preferably 20% by mass or more and 100% by mass or less, and more preferably 30% by mass or more and 100% by mass or less.

The transition metal content in the polyaryletherketone resin composition of the present invention is quantitatively determined by performing ashification on the polyaryletherketone resin composition, thermally decomposing the ashificated matter with sulfuric acid and hydrofluoric acid, and then analyzing a constant solution obtained by dissolving the ashificated matter in dilute sulfuric acid or aqua regia using an ICP mass spectrometer and an ICP emission spectrophotometer.

The content of the polyaryletherketone (A) in the polyaryletherketone resin composition can be measured as follows. The polyaryletherketone resin composition is dissolved in a solvent in which the polyaryletherketone (A) is dissolved, for example, sulfuric acid or the like, an insoluble matter is filtered, and the dissolved matter is precipitated and recovered with a poor solvent. As a solvent in which a recovered product is dissolved, for example, a mixed solvent of chloroform and dichloroacetic acid, a mixed solvent of chlorophenol and halogenated benzens, or the like can be used to perform measurement by qualitative quantitative analysis such as high performance liquid chromatography.

<Multivalent Amine (D)>

The polyaryletherketone resin composition of the present invention preferably contains a multivalent amine (D). When the multivalent amine (D) is contained, the mechanical properties can be further improved.

The multivalent amine (D) is not particularly limited as long as it has two or more amino groups in one molecule, but the number of amino groups is preferably 2 or more and 10 or less from the viewpoint of heat stability and maintenance of mechanical properties. In addition, since a multivalent amine that does not volatilize when the polyaryletherketone resin composition is heated at a temperature equal to or higher than the melting point of the polyaryletherketone (A) is preferable, a multivalent amine having a vapor pressure of less than 1 atm at 300° C. is preferable. A multivalent amine having a vapor pressure of less than 1 atm at preferably 325° C., more preferably 350° C. When the polyaryletherketone resin composition of the present invention is melt-mixed and formed, how much the multivalent amine (D) is retained in the polyaryletherketone resin composition depends on the volatility thereof. A multivalent amine having a vapor pressure of 1 atm or more at 300° C. tends to have too high volatility to be sufficiently retained in the resin composition. The limit of the volatility is expressed not as the limit of boiling point but as the limit of the vapor pressure, since it sublimates depending on the type of multivalent amine and does not show the true boiling point. For compounds that show a boiling point, the limit of volatility can be expressed as a boiling point higher than 300° C. at 1 atm.

Preferable examples of the multivalent amines (D) include aliphatic amines such as 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane and 1,18-diaminooctadecane; and aromatic amine compounds such as 2,2'-biphenyldiamine, 4,4'-biphenyldiamine, 4,4'-diaminodiphenyl ether, 3,3'-diaminodiphenyl sulfone, 4,4'-diaminodiphenyl sulfone, 1,4-bis(4-aminophenoxy) benzene, 1,3-bis(3-aminophenoxy) benzene, 2,2-bis[4-(4-aminophenoxy) phenyl] hexafluoropropane, 9,9-bis(4-aminophenyl) fluorene, 2,2-bis[4-(4-aminophenoxy) phenyl] propane, 4,4'-diaminobenzophenone, 3,3'-diaminobenzophenone, meta-tolidine, ortho-tolidine, and 3,3'-diaminobenzidine. Among these, an aromatic amine compound is preferable from the viewpoint of low volatility, a multivalent amine having a diphenyl ether skeleton is more preferable from the viewpoint of excellent affinity with polyaryletherketone (A), and 4,4'-diaminodiphenyl ether is still more preferable.

When the polyaryletherketone resin composition of the present invention contains the multivalent amine (D), the amino group of the multivalent amine (D) is bonded to the ketone group of the polyaryletherketone (A) by a nucleophilic addition reaction, so that a crosslinked structure can be appropriately formed to improve the mechanical properties.

The polyaryletherketone resin composition of the present invention preferably contains 0.01 parts by mass or more and 5 parts by mass or less of the multivalent amine (D) with respect to 100 parts by mass of the polyaryletherketone (A). When the content is 0.01 parts by mass or more, the mechanical properties of the polyaryletherketone resin composition can be further improved. When the content is 5 parts by mass or less, reduction in toughness due to excessive crosslinking is easily suppressed.

As a method for measuring the content of the multivalent amine (D), the content of the polyaryletherketone resin composition can be measured by the qualitative quantitative analysis such as high performance liquid chromatography after filtering the insoluble matter using a solvent in which the polyaryletherketone (A) and the multivalent amine are dissolved, for example, a mixed solvent of chloroform and dichloroacetic acid, or a mixed solvent of chlorophenol and halogenated benzens.

<Fibrous Filler (E)>

The polyaryletherketone resin composition of the present invention preferably further contains a fibrous filler (E). By containing the fibrous filler, the mechanical properties can be further improved.

Examples of the fibrous filler (E) include glass fiber, carbon fiber, aramid fiber, polyamide fiber, polyester fiber, vinylon fiber, cotton, hemp fiber, kenaf fiber, bamboo fiber, rayon, steel fiber, and aluminum fiber. Examples of the shape of these fibrous fillers include shapes of continuous fibers, short fibers such as chopped strands, and whiskers.

The polyaryletherketone resin composition of the present invention preferably contains 10 parts by mass or more and 400 parts by mass or less of the fibrous filler (E) with respect to 100 parts by mass of the polyaryletherketone (A). When the content is 10 parts by mass or more, the mechanical properties of the polyaryletherketone resin composition can be further improved. In addition, when the content is 400 parts by mass or less, molding processability is unlikely to be deteriorated.

The content of the fibrous filler (E) can be measured as follows. As for the polyaryletherketone resin composition, the insoluble matter is filtered using a solvent in which the polyaryletherketone (A) and the multivalent amine (D) are dissolved, for example, a mixed solvent of chloroform and dichloroacetic acid, or a mixed solvent of chlorophenol and halogenated benzens, and the fibrous filler (E) and the transition metal compound (B) are recovered as a filtered product. Furthermore, the transition metal compound (B) is dissolved by a solvent and then removed, the fibrous filler is recovered, and the mass after washing is measured.

<Fiber Reinforced Plastic Base and Molded Article>

A fiber reinforced plastic base of the present invention is obtained by impregnating a continuous fibrous filler (E) or a reinforcing fiber base in which a discontinuous fibrous filler (E) is dispersed with the polyaryletherketone resin composition of the present invention.

That is, as the fiber reinforced plastic base of the present invention, the following two aspects can be mentioned. A first aspect is a fiber reinforced plastic base obtained by impregnating a continuous fibrous filler (E) with the polyaryletherketone resin composition. A second aspect is a fiber reinforced plastic base obtained by impregnating a reinforcing fiber base in which a discontinuous fibrous filler (E) is dispersed with the polyaryletherketone resin composition.

The continuous fibrous filler (E) in the first aspect refers to a fiber reinforced plastic base in which the reinforced fibers are not interrupted. Examples of the form and arrangement of the continuous fibrous filler (E) include those aligned in one direction, textile (cloths), knitting, braid, and tow. Among these, it is preferable that the continuous fibrous filler (E) is arranged in one direction because the mechanical properties in a specific direction can be efficiently enhanced.

The reinforcing fiber base in which the discontinuous fibrous filler (E) is dispersed in the second aspect refers to a mat-like material in which the fibrous filler is cut and dispersed in the fiber reinforced plastic base. The reinforcing fiber base can be obtained by any method such as a wet process in which fibers are dispersed in a solution and then produced into a sheet, or a dry process using a carding device or an airlaid device. From the viewpoint of productivity, a dry process using a carding device or an airlaid device is preferable. The number average fiber length of the discontinuous fibrous filler (E) in the reinforcing fiber base is preferably 3 to 100 mm. When the number average fiber length of the discontinuous fibers is 3 mm or more, the reinforcing effect by the discontinuous fibers is sufficiently exhibited, and the mechanical strength of the resulting fiber reinforced plastic base can be further improved. The thickness is preferably 5 mm or more. On the other hand, when the number average fiber length of the discontinuous fibers is 100 mm or less, the fluidity at the time of molding can be further improved. The number average fiber length of the discontinuous fibers is more preferably 50 mm or less, and still more preferably 30 mm or less.

The number average fiber length of the discontinuous fibers can be determined by the following method. First, a sample of 100 mm×100 mm is cut out from the fiber reinforced plastic base, and the cut sample is heated in an electric furnace at 600° C. for 1.5 hours to burn off a matrix resin. From the fiber reinforced plastic base thus obtained, 400 discontinuous reinforcing fiber bundles are randomly collected. The fiber length of the discontinuous reinforcing fiber bundle taken out is measured in units of 1 mm using a caliper, and the number average fiber length (Ln) can be calculated from the following formula.

$$Ln = \Sigma Li / 400$$

(Li: Measured fiber length (i=1, 2, 3, . . . 400) (unit: mm)).

The number average fiber length of the discontinuous fibers can be adjusted to the above range by cutting the fibers to a desired length at the time of producing the reinforcing fiber base. The orientation of the discontinuous fiber mat is not particularly limited, and is preferably isotropically dispersed from the viewpoint of moldability.

Examples of the method for impregnating the continuous fibrous filler (E) with the polyaryletherketone resin composition, in the first aspect, include a film method in which a film-shaped polyaryletherketone resin composition is melted and pressed to impregnate a reinforcing fiber bundle with a polyaryletherketone resin composition, a commingle process in which after blended spinning a fibrous polyaryletherketone resin composition with a reinforcing fiber bundle, the fibrous polyaryletherketone resin composition is melted and pressed to impregnate the reinforcing fiber bundle with the fibrous polyaryletherketone resin composition, a fiber impregnation method in which a powdered polyaryletherketone resin composition is dispersed in a gap between fibers in a reinforcing fiber bundle and then the powdered polyaryletherketone resin composition is melted and pressed to impregnate the reinforcing fiber bundle with the polyaryletherketone resin composition, and a melt impregnation method in which a reinforcing fiber bundle is immersed in a molten polyaryletherketone resin composition and pressed to impregnate the reinforcing fiber bundle with the polyaryletherketone resin composition. The melt impregnation method is preferable because various kinds of fiber reinforced plastic bases having various thicknesses and fiber volume contents can be produced.

Examples of the method for impregnating the reinforcing fiber base in which the discontinuous fibrous filler (E) is dispersed with the polyaryletherketone resin composition, in the second aspect, include a method in which a polyaryletherketone resin composition is supplied by an extruder to impregnate the reinforcing fiber base with the polyaryletherketone resin composition, a method in which a powdery polyaryletherketone resin composition is dispersed in a fiber layer of a reinforcing fiber base and melted, a method in which a polyaryletherketone resin composition is formed into a film and laminated to a reinforcing fiber base, a method in which a solvent is volatilized after the polyaryletherketone resin composition is dissolved in a solvent and the reinforcing fiber base is impregnated with the polyaryletherketone resin composition in a state of a solution, a method in which the polyaryletherketone resin composition is formed into a fiber and a mixed yarn with a discontinuous fiber, and a method in which the polyaryletherketone non-woven fabric is laminated using a meltblow non-woven fabric.

Further, in the fiber reinforced plastic base of the present invention, a desired impregnation property can be selected according to the use and purpose thereof. Examples thereof include a prepreg having a higher impregnation property, a semi-impregnated semipreg, and a fabric having a low impregnation property. In general, a molded article having a higher impregnation property is preferable because a molded article having excellent dynamic characteristics can be obtained by molding in a short time.

The fiber reinforced plastic base impregnated with the polyaryletherketone resin composition of the present invention has excellent heat stability, and therefore has excellent bond strength when the fiber reinforced plastic bases are bonded to each other. As a factor of this, it is considered that the fiber reinforced plastic bases are heated in an oxygen atmosphere at the time of bonding the fiber reinforced plastic bases to each other, but oxidative deterioration on the surface of the bases can be suppressed, so that the bond strength is excellent.

The molded article of the present invention is obtained by molding the polyaryletherketone resin composition of the present invention or the fiber reinforced plastic base of the present invention.

<Method for Producing Polyaryletherketone Resin Composition>

The method for producing a polyaryletherketone resin composition of the present invention is not particularly limited, and preferable examples thereof include a method in which the polyaryletherketone (A) and the transition metal compound (B), and if necessary, the multivalent amine (D) are each dry-blended, supplied from an extruder main feeder, if necessary, the fibrous filler (E) is supplied from a side feeder of the extruder, and melt-kneaded at a temperature equal to or higher than the melting point of the polyaryletherketone (A).

<Method for Molding Polyaryletherketone Resin Composition>

The method for molding a polyaryletherketone resin composition of the present invention is not particularly limited, and examples thereof include methods such as injection molding, extrusion molding, and compression molding. By such a molding method, a molded product such as a molded article, a sheet, or a film can be obtained.

Examples of the method for molding the fiber reinforced plastic base impregnated with the polyaryletherketone resin composition include a press molding in which a material obtained by stacking the fiber reinforced plastic base in an optional configuration is heated and pressed, an autoclave molding in which the fiber reinforced plastic base is charged into an autoclave and heated and pressed, a bagging molding in which the inside of the film or the like is wrapped under reduced pressure and heated in an oven while being pressed at atmospheric pressure, and a wrapping tape method in which a tape is wound while applying tension and heated in an oven.

As the press molding, it is possible to employ a hot press method in which a fiber reinforced plastic base is placed in advance in a mold, pressed and heated together with moldtightening, and then the fiber reinforced plastic base is cooled by cooling the mold while the moldtightening is performed to obtain a molded article, or a stamping molding in which the fiber reinforced plastic base is heated in advance to a temperature equal to or higher than the melting temperature of a thermoplastic resin by a heating device such as a far infrared heater, a heating plate, a high temperature oven, or induction heating, and the thermoplastic resin is placed on a mold to be the lower surface of the molding mold in a state of being melted and softened, and then the mold is closed to perform moldtightening, followed by press-cooling. The press molding is not particularly limited, and is preferably stamping molding from the viewpoint of accelerating the molding cycle and enhancing productivity.

<Other Components>

In the polyaryletherketone resin composition of the present invention, a thermoplastic resin other than polyaryletherketone, an inorganic filler other than a fibrous filler such as titanium oxide or calcium carbonate, an antioxidant, a heat stabilizer, a UV absorber, a colorant, and the like can also be added as desired.

Examples of the thermoplastic resin other than polyaryletherketone include at least one selected from a polyolefin resin such as a polycarbonate resin, a polyarylate resin, an ABS resin, a poly (meth)acrylate resin, a (meth)acrylate polyethylene resin, a polypropylene resin, and a syndiotactic polystyrene resin, a polyvinyl alcohol resin, a polyvinylidene chloride resin, a polyester resin, a polyamide resin, a polyacetal resin, a polyimide resin, a polytetrafluoroethylene resin, a polysulfone resin, a polyarylenesulfide resin, and a polyphenyleneether resin, and one or two or more kinds thereof may be used in combination. Among these, a polyimide resin, a polytetrafluoroethylene resin, a polysulfone resin, a polyarylenesulfide resin, and a polyphenyleneether resin, which are excellent in the heat resistance, are preferable from the viewpoint of not impairing the heat resistance of the polyaryletherketone, and a polyimide resin and a polysulfone resin, which are excellent in compatibility with the polyaryletherketone, are more preferable from the viewpoint of improving the mechanical properties.

The polyimide resin is a polymer having an imide bond in a repeat unit. In the present invention, in addition to an imide bond in a repeat unit, a polyetherimide resin having an ether bond or a polyamideimide resin having an amide bond is also classified as a polyimide resin.

The polysulfone resin is a polymer having a sulfonyl group in a repeat unit. Polyethersulfone and polyphenylsulfone are also classified as polysulfone resins.

<Application Example of Molded Article>

The molded article obtained from the polyaryletherketone resin composition of the present invention include applications for electronic components such as a connector, a coil, a sensor, a LED lamp, a socket, a resistor, a relay case, a small switch, a coil bobbin, a capacitor, a variable condenser case, an optical pickup, an oscillator, various terminal boards, a transformer, a plug, a printed circuit board, a tuner, a speaker, a microphone, a headphone, a small motor, a magnetic head base, a power module, a semiconductor, a LCD, a FDD carriage, a FDD chassis, a motor brush holder, a parabolic antenna, and a computer related part; applications for electrical equipment parts such as a generator, a motor, a transformer, a current transformer, a voltage regulator, a rectifier, an inverter, a relay, a power contact, a switch, a circuit breaker, a knife switch, a multipole rod, and an electrical component cabinet; home and office electrical product parts applications such as a VTR part, a TV part, an iron, a hair dryer, a rice cooker part, a microwave oven part, an acoustic part, an audio/laserdisc (registered trademark)/compact disc, an audio/video equipment part such as DVDs, a lighting part, a refrigerator part, an air conditioner part, a typewriter part, and a word processor part; machine-related parts applications such as an office computer related part, a telephone equipment related part, a facsimile related part, a copier-related part, a cleaning jig, a motor part, a lighter, and a typewriter; precision machine-related parts applications such as optical equipment such as a microscope, a binocular, a camera, and a watch; automotive/vehicle-related parts applications such as an alternator terminal, an alternator connector, an IC regulator, a potency meter base for light deer, various valves such as an exhaust gas valve, fuel-related exhaust system intake system various pipes, an air intake nozzle snorkel, an intake manifold, a fuel pump, an engine cooling water joint, a carburetor main body, a carburetor spacer, an exhaust gas sensor, a cooling water sensor, an oil temperature sensor, a brake pad wear sensor, a throttle position sensor, a crankshaft position sensor, an air flow meter, a brake pad wear sensor, a thermostat base for air conditioner, a heating hot air flow control valve, a brush holder for radiator motor, a water pump impeller, a turbine vane, a wiper motor related part, a distributor, starter switch, a starter relay, a transmission wire harness, a window washer nozzle, an air conditioner panel switch board, a fuel-related electromagnetic valve coil, a fuse connector, a horn terminal, an electrical component insulation plate, a step motor rotor, a lamp socket, a lamp reflector, a lamp housing, a brake piston, a solenoid bobbin, an engine oil filter, and an igniter case; and various aerospace applications.

EXAMPLES

Hereinafter, the present invention will be described with reference to examples, but the present invention is not limited by these examples. Various resins, compounds, and the like used in examples and comparative examples are described below.

<Polyaryletherketone (A)>
 (A-1) Polyetheretherketone ("Victrex (registered trademark)" 90 G produced by Victrex plc, melting point: 343° C.)
 (A-2) Polyetherketoneketone ("KEPSTAN (registered trademark)" 7002 produced by Arkema S. A., melting point: 332° C.)
<Polyphenylene Sulfide>

Reference Example 1

8.27 kg (70.00 mol) of 47.5% sodium hydrosulfide, 2.94 kg (70.63 mol) of 96% sodium hydroxide, 11.45 kg (115.50 mol) of N-methyl-2-pyrrolidone (NMP), 1.89 kg (23.1 mol) of sodium acetate, and 5.50 kg of ion-exchanged water were charged into a 70 liter autoclave with a stirrer and a bottom valve, and gradually heated to 245° C. over about 3 hours while nitrogen was passed at normal pressure, 9.77 kg of water and 0.28 kg of NMP were distilled off, and then a reaction vessel was cooled to 200° C. The amount of water remaining in the system per 1 mol of the charged amount of the alkali metal sulfide was 1.06 mol including water consumed for hydrolysis of NMP. The scattered amount of hydrogen sulfide was 0.02 mol per 1 mol of the charged amount of alkali metal sulfide.

The reaction vessel was cooled to 200° C., 10.42 kg (70.86 mol) of p-dichlorobenzene and 9.37 kg (94.50 mol) of NMP were then added, the reaction vessel was sealed under nitrogen gas, the temperature was raised from 200° C. to 270° C. at a rate of 0.6° C./min with stirring at 240 rpm, and the reaction was carried out at 270° C. for 140 minutes. Thereafter, 2.40 kg (133 mol) of water was press-fitted while cooling from 270° C. to 250° C. over 15 minutes. Then, the mixture was gradually cooled from 250° C. to 220° C. over 75 minutes, and then rapidly cooled to around room temperature, and the contents were taken out.

The contents were diluted with about 35 liters of NMP, stirred as a slurry at 85° C. for 30 minutes, and then filtered off with a 80 mesh wire gauze (opening: 0.175 mm) to obtain a solid. The obtained solid was washed with about 35 liters of NMP and filtered off in the same manner. An operation of adding the obtained solid to 70 liters of ion-exchanged water, stirring the mixture at 70° C. for 30 minutes, and then filtering the mixture with a 80 mesh wire mesh to recover the solid was repeated 3 times in total. The obtained solid and 32 g of acetic acid were added to 70 liters of ion-exchanged water, stirred at 70° C. for 30 minutes, and then filtered with a 80 mesh wire mesh. The obtained solid was further added to 70 liters of ion-exchanged water, stirred at 70° C. for 30 minutes, and then filtered with a 80 mesh wire mesh to recover the solid. The solid thus obtained was dried at 120° C. under nitrogen flow to obtain a dried polyphenylene sulfide resin. A mass average molecular weight was 48600, and a melting point was 280° C.

<Transition Metal Compound (B)>
 (B-1) Nickel (II) formate dihydrate (produced by FUJIFILM Wako Pure Chemical Corporation)
 (B-2) Nickel (II) acetate tetrahydrate (produced by FUJIFILM Wako Pure Chemical Corporation)
 (B-3) Nickel (II) iodide hexahydrate (produced by FUJIFILM Wako Pure Chemical Corporation)
 (B-4) Copper (II) formate tetrahydrate (produced by FUJIFILM Wako Pure Chemical Corporation)
 (B-5) 3% by mass aqueous solution of nickel (II) formate dihydrate
<(C) Alkali Metal Compound>
 (C-1) Trisodium phosphate anhydrous (produced by TAIHEI CHEMICAL INDUSTRIAL CO., LTD.)
 (C-2) Potassium carbonate anhydrous (produced by FUJIFILM Wako Pure Chemical Corporation)
<Amine Compound (D)>
 (D-1) 4,4'-diaminodiphenyl ether (vapor pressure at 300° C.: 0.02 atm, produced by Tokyo Chemical Industry Co., Ltd.)
<Fibrous Filler (E)>
 (E-1) Carbon fiber "TORAYCA (registered trademark)" cut fiber TV 14-006 (produced by Toray Industries, Inc.)
 (E-2) Discontinuous carbonfiber mat
 A carbon fiber chopped fiber obtained by cutting "TORAYCA (registered trademark)" T700S-12k produced by Toray Industries, Inc. to a length of 20 mm was introduced into a carding device, and the web coming out was cross-lapped to form a sheet-like carbon fiber sheet having a basis weight of 100 g/m$^2$. The obtained carbon fiber sheet was placed in a press machine, and pressurized at a pressure of 20 MPa for 5 seconds to obtain a discontinuous carbonfiber mat.
 (E-3) Carbonfiber bundle ("TORAYCA (registered trademark)" T700S-12k produced by Toray Industries, Inc.)
<Method for Producing Polyaryletherketone Resin Composition>

Among the raw materials shown in each of examples and comparative examples, raw materials excluding carbon fibers (E-1) were dry-blended with a composition shown in the table, and supplied from a main feeder of a twin screw extruder (TEX 30a produced by The Japan Steel Works, Ltd.), the carbon fibers (E-1) were supplied from a side feeder (one installed at a position of 0.35 when viewed from upper stream side in a case where the total length of the screw was 1.0), and melt-kneaded at a cylinder temperature of 360° C. (300° C. in Comparative Example 3 and Comparative Example 8) and a screw rotation speed of 200 rpm, strings discharged from a die were immediately cooled in a water bath, pelletized by a strand cutter, and vacuum-dried at 160° C. (120° C. in Comparative Example 3 and Comparative Example 8) for 12 hours.

<Method for Producing Discontinuous Fiber Reinforced Plastic Base Impregnated with Polyaryletherketone Resin Composition>

Among the raw materials described in Example 14 and Comparative Example 9 in Table 3, raw materials excluding the discontinuous carbonfiber mat (E-2) were dry-blended with the composition shown in the table, charged into a hopper of a uniaxial extruder heated to 380° C., melt-kneaded, and then extruded into a film from a film die to prepare a film having a thickness of 100 μm.

The winding direction of the discontinuous carbonfiber mat (E-2) was set to 0°, 12 discontinuous fiber mats were stacked so as to be)(0°/90°/0°/90°/0°/90° s, and the polyaryletherketone resin composition film was further laminated in the laminated discontinuous carbonfiber mat so that the mass ratio of the carbon fiber and the polyaryletherketone resin composition film was 50:50, then the whole was sandwiched between stainless steel plates, preheated at 380° C. for 90 seconds, and then hot-pressed at 370° C. for 180 seconds while a pressure of 2.0 MPa was applied. Then, the discontinuous fiber reinforced plastic base was cooled to 50° C. in a pressed state to obtain a discontinuous fiber reinforced plastic base having a thickness of 2 mm.

<Method for Producing Continuous Fiber Reinforced Plastic Base Impregnated with Polyaryletherketone Resin Composition>

Among the raw materials described in Examples 15 to 17 and Comparative Example 10 in Table 3, the raw materials excluding carbonfiber bundles (E-3) were dry-blended with the composition shown in the table, charged into a hopper of a uniaxial extruder heated to 380° C., and melt-kneaded, then the strings discharged from the die were immediately cooled in a water bath, pelletized by a strand cutter, and vacuum-dried at 160° C. for 12 hours. 16 bobbins each wound with the carbonfiber bundles (E-3) were prepared, and the carbonfiber bundles were each continuously fed out from the bobbin through a thread path guide. The continuously fed carbonfiber bundles were impregnated with resin composition pellets obtained by the method described above and supplied in a fixed amount from a filled feeder in an impregnation die heated to 380° C. The carbon fiber impregnated with the resin composition in the impregnation die was continuously withdrawn from the nozzle of the impregnation die at a withdrawal rate of 1 m/min using a drawing roll. The drawn carbonfiber bundle passed through a cooling roll to cool and solidify the resin composition, and was wound up into a winder as a continuous fiber reinforced plastic base. In the obtained continuous fiber reinforced plastic base, a thickness was 0.08 mm, a width was 50 mm, reinforcing fiber directions were arranged in one direction, and a volume content was 60%. Further, 6 continuous fiber reinforced plastic bases each having a thickness of 0.08 mm were stacked in the same direction, and pressed with a press machine heated to 380° C. at a pressure of 15 bar for 20 minutes to obtain a laminate of continuous fiber reinforced plastic bases each having a thickness of 0.45 mm.

<Method for Evaluating Polyaryletherketone Resin Composition>

Evaluation methods in examples and comparative examples will be described.

(1) Transition Metal Content in Polyaryletherketone Resin Composition

The polyaryletherketone resin composition pellet was ashificated, and the ashificated matter was subjected to heat sealed decomposition with sulfuric acid and hydrofluoric acid, and then dissolved in aqua regia, and the obtained constant solution was measured by ICP-MS (inductively coupled plasma mass spectrometry: ELEMENT produced by Thermo Quest).

(2) Complete Decomposition Temperature of Transition Metal Compound

Approximately 10 mg of a transition metal compound (B) alone was weighed, and held at 50° C. for 1 minute under nitrogen flow using a thermal mass spectrometer (TGA 7 produced by PerkinElmer, Inc.), then the temperature was raised from 50° C. to 500° C. at a temperature raising rate of 10° C./min, and a mass reduction when the mass at 50° C. was taken as 100% was measured.

Figure 1:
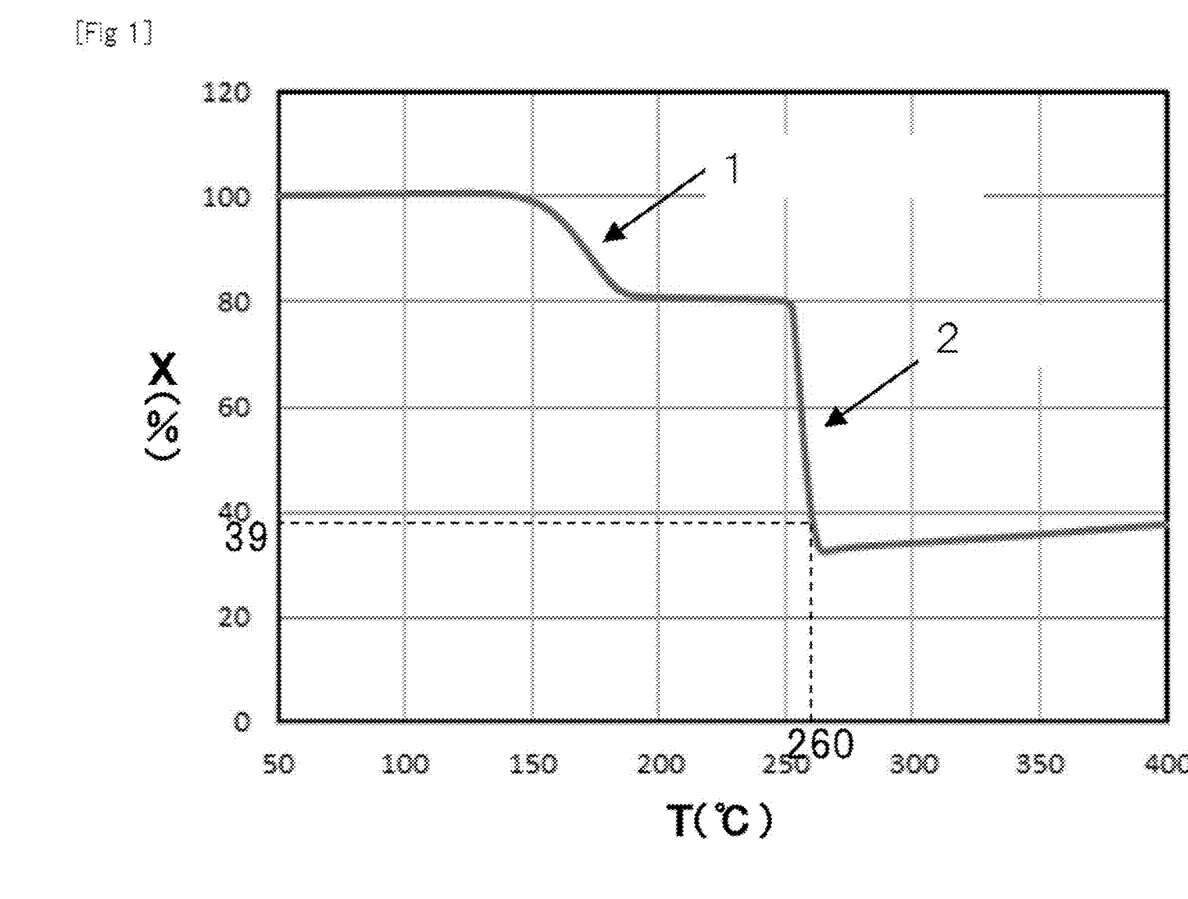
FIG. 1 is a diagram illustrating a result of thermogravimetric analysis of nickel (II) formate dihydrate (B-1) under predetermined conditions.

As an example, the results of thermogravimetric analysis of nickel (II) formate dihydrate (B-1) under the above conditions are illustrated in FIG. 1. A horizontal axis represents a temperature T (° C.), and a vertical axis represents a mass fraction X (%). In the thermogravimetric analysis of nickel (II) formate dihydrate, the dihydrate corresponding to 19.5% by mass calculated from the molecular weight out of the total mass is first volatilized (Symbol 1 in FIG. 1), and the formic acid corresponding to 48.8% by mass is volatilized (Symbol 2 in FIG. 1). The complete decomposition temperature is defined as a temperature at which the weight loss rate reaches 90% of the mass of the compound component excluding the transition metal of the transition metal compound. Since the portion excluding the mass of nickel in nickel (II) formate dihydrate is 68.3% by mass, 90% thereof is 61% by mass. Therefore, the temperature at which a weight loss of 61.3% by mass was observed is the complete decomposition temperature of nickel (II) formate dihydrate. From FIG. 1, the complete decomposition temperature of nickel (II) formate dihydrate is 260° C.

(3) Measurement of Melt Viscosity Before and After Heating

The polyaryletherketone resin composition pellets were freeze-pulverized/vacuum-dried and used as a sample for melt viscosity measurement before heating. The vacuum drying condition is 160° C. (120° C. in Comparative Example 3 and Comparative Example 8) for 12 hours. In addition, about 50 mg of a sample freeze-pulverized/vacuum-dried on a 25 mm×7 mm×7 mm microaluminum dish (produced by Alpha Purchase) was placed flat so as to have a depth of about 300 μm, and heated in an electric furnace under the air at the melting point of the resin (A)+70° C. for 50 minutes, and the heated sample freeze-pulverized/vacuum-dried was used as a sample for melt viscosity measurement after heating. The closer the melt viscosity retention rate before and after heating is to 100%, the better the heat stability is. The melt viscosity measurement conditions are as follows.

Apparatus: Rheometer (Physica MCR 501 produced by Anton Paar)
Atmosphere: Under nitrogen flow
Measurement temperature: Melting point of resin (A)+70° C.
Angular frequency 6.28 rad/sec
Sample amount: 0.7 g
Melt viscosity: Complex viscosity after retention for 5 minutes under the above conditions.

(4) Tensile Properties Before and After Heating

The above polyaryletherketone resin composition pellets were freeze-pulverized/vacuum-dried, and injection-molded using a small injection molding machine (Haake MiniJetPro produced by thermo fisher scientific) under the conditions of a cylinder temperature of 380° C. (350° C. in Comparative Example 3 and Comparative Example 8) and a mold temperature of 170° C. (120° C. in Comparative Example 3 and Comparative Example 8) to obtain a dumbbell of the ISO 527-2-5A standard, thereby obtaining a molded article for a tensile test before heating. In addition, about 50 mg of a sample freeze-pulverized/vacuum-dried on a 25 mm×7 mm×7 mm microaluminum dish (produced by Alpha Purchase) was placed flat so as to have a depth of about 300 μm, and heated in an electric furnace under the air at the melting point of the resin (A)+70° C. for 50 minutes, and the heated sample freeze-pulverized/vacuum-dried was molded under the molding conditions described above to obtain a molded article for tensile test after heating. The closer the tensile strength retention rate and the tensile breaking elongation retention rate before and after heating are to 100%, the better the heat stability is. The tensile test conditions are as follows.

Apparatus: Universal testing machine (Autograph AG-20 kNX produced by Shimadzu Corporation)
Atmosphere: 23° C.×50% RH
Length between chucks: 50 mm
Gauge length: 20 mm
Tensile rate: 5 ram/min.

(5) Welding Test

The discontinuous fiber reinforced plastic base obtained by the above production method was cut into a size of 300 mm×400 mm×2 mm, preheated until the center temperature of the base reached 400° C., then placed on a press board heated to 240° C., and pressed at 10 MPa for 30 seconds to be stamping-molded, thereby obtaining a fiber-reinforced resin molded body, and welding was performed using the fiber-reinforced resin molded body.

Figure 2:
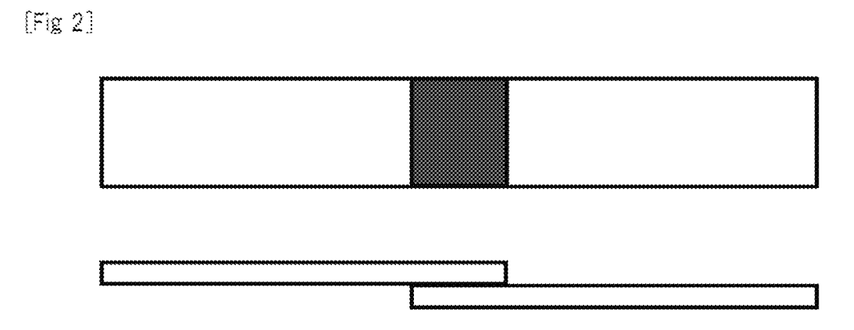
FIG. 2 is a schematic view in which fiber-reinforced resin molded bodies are welded to each other.

The fiber-reinforced resin molded bodies (length: 100 mm, width: 25 mm, thickness: 2 mm) having the same type were stacked as illustrated in FIG. 2, and welding was performed by vibration welding while a surface pressure of 1.6 MPa was applied to a surface having a width of 25 mm and a welding margin of 12.5 mm.

(6) Tensile test of welded body

The shear strength was measured by a lap shear test (shear test) according to JIS K 6851. It is possible to quantitatively evaluate the bond strength by measuring the tensile strength when tension is applied in directions opposite to each other so as to apply a shear load and breakage or deformation (for example, interfacial fracture) of a predetermined amount or more occurs in a bond portion.

(7) Formability

Figure 3:
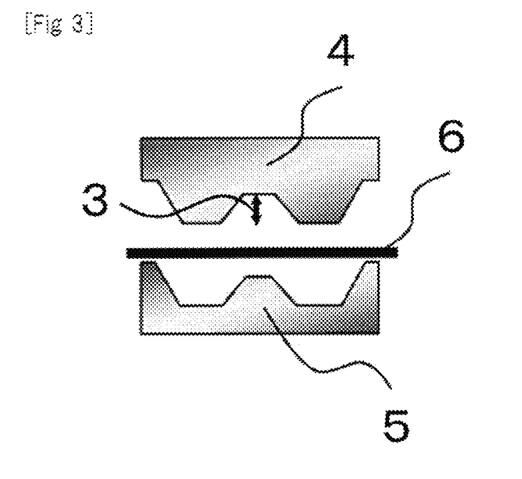
FIG. 3 is a schematic view of a molded article prepared for evaluation of formability used in examples of the present invention.

A laminate of the continuous fiber reinforced plastic bases obtained by the above production method was cut into a thickness of 0.45 mm, a width of 13 mm, and a length of 125 mm, and a laminate 6 preheated until the center temperature of the base reached 420° C. was put between molds including an upper mold 4 and a lower mold 5 having an uneven shape as illustrated in FIG. 3 using a press machine (SA 303 produced by TESTER SANGYO CO., LTD.) temperature-controlled to 260° C., maintained at a pressure at 1.0 MPa for 5 minutes, transferred together with the molds to the press machine (SA 303 produced by TESTER SANGYO CO., LTD.) temperature-controlled to 30° C., and cooled to obtain a molded article deformed along the shape of the mold. A depth 3 of an uneven part of the molded article is measured with a caliper. Next, a silicone-based resin is applied to one mold having the uneven shape, and the mold is left to stand for 24 hours in an atmosphere of 23° C. to be cured, and then the depth of the uneven shape made of the silicone-based resin is measured with a caliper. A value obtained by dividing the depth of the uneven part of the strip-shaped molded article by the depth of the uneven part of the silicone-based resin was defined as a transcription rate, and the uneven shape of 0.9 or more was defined as A, a uneven shape of 0.8 or more and less than 0.9 was defined as B, and a uneven shape of less than 0.8 was defined as C.

Examples 1 to 13, Comparative Examples 1 to 8

TABLE 1-1

| | | | Example 1 | Example 2 | Example 3 | Example 4 | Example 5 | Example 6 | Example 7 |
|---|---|---|---|---|---|---|---|---|---|
| Resin composition | Polyaryletherketone (A) | Type | A-1 | A-1 | A-1 | A-1 | A-1 | A-1 | A-1 |
| | | Parts by mass | 100 | 100 | 100 | 100 | 100 | 100 | 100 |
| | Transition metal compound (B) | Type | B-1 | B-1 | B-1 | B-2 | B-3 | B-4 | B-5 |
| | | Parts by mass | 0.05 | 0.5 | 5 | 0.5 | 0.5 | 0.5 | 16.7 |
| | Multivalent amine (D) | Type | — | — | — | — | — | — | — |
| | | Parts by mass | — | — | — | — | — | — | — |
| | Fibrous filler (E) | Type | — | — | — | — | — | — | — |
| | | Parts by mass | — | — | — | — | — | — | — |
| Content | Transition metal content in resin composition (per 100 parts by mass of polyaryletherketone resin (A)) | Parts by mass | 0.016 | 0.16 | 1.6 | 0.12 | 0.07 | 0.14 | 0.16 |
| Decomposition temperature | Complete decomposition temperature of transition metal compound (B) | ° C. | 260 | 260 | 260 | 385 | >500 | 240 | 260 |
| Heat stability | Melt viscosity of resin composition | Pa·s | 190 | 182 | 198 | 181 | 194 | 190 | 179 |
| | Melt viscosity of resin composition after heating at melting point of (A) + 70° C. for 50 minutes | Pa·s | 376 | 233 | 333 | 380 | 524 | 627 | 200 |

TABLE 1-1-continued

|  |  |  | Example 1 | Example 2 | Example 3 | Example 4 | Example 5 | Example 6 | Example 7 |
|---|---|---|---|---|---|---|---|---|---|
|  | Melt viscosity retention rate before and after heating | % | 198 | 128 | 168 | 210 | 270 | 330 | 112 |
| Tensile properties | Before heating | Tensile strength | MPa | 88 | 90 | 90 | 88 | 88 | 87 | 88 |
|  |  | Tensile breaking elongation | % | 28 | 28 | 20 | 28 | 29 | 28 | 28 |
|  | After heating at melting point of (A) + 70° C. for 50 minutes | Tensile strength | MPa | 87 | 89 | 90 | 86 | 87 | 86 | 88 |
|  |  | Tensile breaking elongation | % | 20 | 26 | 16 | 18 | 14 | 12 | 28 |
|  | Before and after heating | Tensile strength retention rate | % | 99 | 99 | 100 | 98 | 99 | 99 | 100 |
|  |  | Tensile breaking elongation retention rate | % | 71 | 93 | 80 | 64 | 48 | 43 | 100 |

TABLE 1-2

|  |  |  |  | Example 8 | Example 9 | Example 10 | Example 11 | Example 12 | Example 13 |
|---|---|---|---|---|---|---|---|---|---|
| Resin composition | Polyaryletherketone (A) | Type | | A-1 | A-1 | A-2 | A-1 | A-1 | A-1 |
|  |  | Parts by mass | | 100 | 100 | 100 | 100 | 100 | 100 |
|  | Transition metal compound (B) | Type | | B-1 | B-1 | B-1 | B-1 | B-1 | B-2 |
|  |  | Parts by mass | | 0.5 | 0.5 | 0.5 | 0.5 | 0.5 | 0.5 |
|  | Multivalent amine (D) | Type | | D-1 | — | — | D-1 | D-1 | D-1 |
|  |  | Parts by mass | | 0.5 | — | — | 0.1 | 3 | 0.5 |
|  | Fibrous filler (E) | Type | | — | E-1 | — | — | — | — |
|  |  | Parts by mass | | — | 43 | — | — | — | — |
| Content | Transition metal content in resin coirposition (per 100 parts by mass of polyaryletherketone resin (A)) | Parts by mass | | 0.16 | 0.16 | 0.16 | 0.16 | 0.16 | 0.12 |
| Decomposition temperature | Complete decomposition temperature of transition metal compound (B) | ° C. | | 260 | 260 | 260 | 260 | 260 | 385 |
| Heat stability | Melt viscosity of resin composition | Pa · s | | 199 | 8900 | 584 | 190 | 204 | 197 |
|  | Melt viscosity of resin composition after heating at melting point of (A) + 70° C. for 50 minutes | Pa · s | | 288 | 13600 | 876 | 276 | 326 | 486 |
|  | Melt viscosity retention rate before and after heating | % | | 145 | 153 | 150 | 145 | 160 | 247 |
| Tensile properties | Before heating | Tensile strength | MPa | 98 | 265 | 79 | 92 | 97 | 96 |
|  |  | Tensile breaking elongation | % | 39 | 1.5 | 86 | 37 | 31 | 36 |
|  | After heating at melting point of (A) + 70° C. for 50 minutes | Tensile strength | MPa | 105 | 270 | 81 | 94 | 105 | 100 |
|  |  | Tensile breaking elongation | % | 34 | 1.4 | 77 | 34 | 25 | 24 |
|  | Before and after heating | Tensile strength retention rate | % | 107 | 102 | 103 | 102 | 108 | 104 |
|  |  | Tensile breaking elongation retention rate | % | 87 | 93 | 90 | 92 | 81 | 67 |

TABLE 2-1

|  |  |  | Comparative Example 1 | Comparative Example 2 | Comparative Example 3 | Comparative Example 4 | Comparative Example 5 |
|---|---|---|---|---|---|---|---|
| Resin composition | Polyaryletherketone (A) | Type | A-1 | A-2 | — | A-1 | A-1 |
|  |  | Parts by mass | 100 | 100 | — | 100 | 100 |

TABLE 2-1-continued

|  |  |  | Comparative Example 1 | Comparative Example 2 | Comparative Example 3 | Comparative Example 4 | Comparative Example 5 |
|---|---|---|---|---|---|---|---|
|  | Polyphenylene sulfide | Type | — | — | Reference Example 3 | — | — |
|  |  | Parts by mass | — | — | 100 | — | — |
|  | Transition metal compound (B) | Type | B-1 | B-1 | B-1 | B-1 | — |
|  |  | Parts by mass | 0.002 | 0.002 | 0.002 | 15 | — |
|  | (C) Alkali Metal Compound | Type | — | — | — | — | — |
|  |  | Parts by mass | — | — | — | — | — |
|  | Fibrous filler (E) | Type | — | — | — | — | E-1 |
|  |  | Parts by mass | — | — | — | — | 43 |
| Content | Transition metal content in resin composition (per 100 parts by mass of polyaryletherketone resin (A)) | Parts by mass | 0.0006 | 0.0006 | 0.0006 | 4.8 | — |
| Decomposition temperature | Complete decomposition temperature of transition metal compound (B) | ° C. | — | — | — | 260 | — |
| Heat stability | Melt viscosity of resin composition | Pa · s | 192 | 586 | 77 | 280 | 9100 |
|  | Melt viscosity of resin composition after heating at melting point of (A) + 70° C. for 50 minutes | Pa · s | 812 | 2795 | 18300 | 1070 | 40200 |
|  | Melt viscosity retention rate before and after heating | % | 423 | 477 | 23766 | 382 | 442 |
| Tensile properties | Before heating | Tensile strength | MPa | 88 | 80 | 77 | 98 | 265 |
|  |  | Tensile breaking elongation | % | 28 | 87 | 7.6 | 6 | 1.4 |
|  | After heating at melting point of (A) + 70° C. for 50 minutes | Tensile strength | MPa | 86 | 83 | 59 | 58 | 260 |
|  |  | Tensile breaking elongation | % | 10 | 27 | 2 | 2 | 0.5 |
|  | Before and after heating | Tensile strength retention rate | % | 98 | 104 | 77 | 59 | 98 |
|  |  | Tensile breaking elongation retention rate | % | 36 | 31 | 21 | 33 | 36 |

TABLE 2-2

|  |  |  | Comparative Example 6 | Comparative Example 7 | Comparative Example 8 |
|---|---|---|---|---|---|
| Resin composition | Polyaryletherketone (A) | Type | A-1 | A-1 | — |
|  |  | Parts by mass | 100 | 100 | — |
|  | Polyphenylene sulfide | Type | — | — | Reference Example 3 |
|  |  | Parts by mass | — | — | 100 |
|  | Transition metal coirpound (B) | Type | — | — | B-1 |
|  |  | Parts by mass | — | — | 0.5 |
|  | (C) Alkali Metal Compound | Type | C-1 | C-2 | — |
|  |  | Parts by mass | 0.5 | 0.5 | — |
|  | Fibrous filler (E) | Type | — | — | — |
|  |  | Parts by mass | — | — | — |
| Content | Transition metal content in resin composition (per 100 parts by mass of polyaryletherketone resin (A)) | Parts by mass | — | — | 0.16 |
| Decomposition temperature | Complete decomposition temperature of transition metal compound (B) | ° C. | — | — | 260 |
| Heat stability | Melt viscosity of resin composition | Pa · s | 190 | 188 | 78 |
|  | Melt viscosity of resin composition after heating at | Pa · s | 838 | 880 | 17200 |

TABLE 2-2-continued

|  |  |  | Comparative Example 6 | Comparative Example 7 | Comparative Example 8 |
|---|---|---|---|---|---|
| | melting point of (A) + 70° C. for 50 minutes | | | | |
| | Melt viscosity retention rate before and after heating | % | 441 | 468 | 22051 |
| Tensile properties | Before heating | Tensile strength MPa | 88 | 89 | 75 |
| | | Tensile breaking elongation % | 26 | 25 | 7.9 |
| | After heating at melting point of (A) + 70° C. for 50 minutes | Tensile strength MPa | 85 | 85 | 67 |
| | | Tensile breaking elongation % | 8 | 8 | 1.8 |
| | Before and after heating | Tensile strength retention rate % | 97 | 96 | 89 |
| | | Tensile breaking elongation retention rate % | 31 | 32 | 23 |

Comparison between Examples 1 to 13 and Comparative Examples 1 to 8 shows that when a specific amount of the transition metal compound is added to the polyaryletherketone resin, the heat stability and the mechanical properties are excellent.

Comparison of Example 2 with Examples 4 and 5 shows that the heat stability and the mechanical properties are more excellent when a complete decomposition temperature of a nickel compound is equal to or lower than a melting point of polyaryletherketone, and further excellent when the complete decomposition temperature is 300° C. or lower.

Comparison between Example 2 and Example 6 shows that the nickel compound is more excellent in the heat stability and the mechanical properties than those of a copper compound.

Comparison between Example 2 and Example 7 shows that a transition metal compound is more excellent in the heat stability and the mechanical properties when added as an aqueous solution than when added as a solid. This is considered to be because the transition metal compound is finely dispersed in the polyaryletherketone resin composition.

Comparison of Examples 2 and 8 shows that the mechanical properties are improved by adding a multivalent amine.

Examples 14 to 17, Comparative Examples 9 and 10

TABLE 3

|  |  |  | Example 14 | Comparative Example 9 | Example 15 | Example 16 | Example 17 | Comparative Example 10 |
|---|---|---|---|---|---|---|---|---|
| Resin composition | Polyaryletherketone (A) | Type | A-1 | A-1 | A-1 | A-1 | A-1 | A-1 |
| | | Parts by mass | 100 | 100 | 100 | 100 | 100 | 100 |
| | Transition metal compound (B) | Type | B-1 | — | B-1 | B-1 | B-1 | — |
| | | Parts by mass | 0.5 | — | 0.5 | 0.05 | 5 | — |
| | Fibrous filler (E) | Type | E-2 | E-2 | E-3 | E-3 | E-3 | E-3 |
| | | Parts by mass | 100.5 | 100 | 195 | 195 | 195 | 195 |
| Content | Transition metal content in resin composition (per 100 parts by mass of polyaryletherketone resin (A)) | Parts by mass | 0.16 | — | 0.16 | 0.016 | 1.6 | — |
| Decomposition temperature | Complete decomposition temperature of transition metal compound (B) | ° C. | 260 | — | 260 | 260 | 260 | — |
| Welding | Tensile shear test | MPa | 45.8 | 7.5 | — | — | — | — |
| | Fracture Form | Pa·s | Base material fracture | Interfacial fracture | — | — | — | — |
| Formability | Transcription rate | | — | — | A | B | B | C |

Comparison between Example 14 and Comparative Example 9 shows that when a specific amount of the transition metal compound is added to the polyaryletherketone resin, the welding strength is excellent. This is considered to be because oxidative deterioration of the surface of the discontinuous fiber reinforced plastic base was possibly suppressed.

Comparison between Examples 15 to 17 and Comparative Example 10 shows that when a specific amount of the transition metal compound is added to the polyaryletherketone resin, excellent formability is achieved. This is considered to be because thickening associated with oxidative deterioration of the continuous fiber reinforced plastic base was possibly suppressed.

INDUSTRIAL APPLICABILITY

The polyaryletherketone resin composition of the present invention can be molded by any method such as generally known injection molding, compression molding, or extrusion molding. The polyaryletherketone resin composition of the present invention can be processed into various electrical and electronic parts, automobile parts, aircraft parts, mechanical parts, and the like, taking advantage of the excellent heat stability and mechanical properties. In addition, the obtained molded article can be used as fibers for clothing, industrial materials, and the like, and films for packaging, magnetic recording, and the like. Furthermore, by using it as a molded article in combination with a fibrous filler, it can be expected to contribute to improvement of fuel efficiency and reduction of global warming gas emission by further weight reduction particularly in automobile and aerospace applications.

DESCRIPTION OF REFERENCE SIGNS

1: Hydrate desorption
2: Formic acid desorption
3: Depth
4: Upper mold
5: Lower mold
6: Laminate

The invention claimed is:

1. A polyaryletherketone resin composition containing a polyaryletherketone (A) and a transition metal compound (B), wherein
the resin composition has a nickel content of 0.01 parts by mass or more and 2 parts by mass or less based on 100 parts by mass of the polyaryletherketone (A) and
the transition metal compound (B) is a nickel formate compound that completely decomposes at a temperature that is equal to or lower than the polyaryletherketone (A) melting point temperature.

2. The polyaryletherketone resin composition according to claim 1, wherein the temperature at which the transition metal compound (B) completely decomposes is 25° C. or higher and 300° C. or lower.

3. The polyaryletherketone resin composition according to claim 1, further comprising: a multivalent amine (D) in an amount of 0.01 parts by mass or more and 5 parts by mass or less with respect to 100 parts by mass of the polyaryletherketone (A).

4. The polyaryletherketone resin composition according to claim 1, further comprising: a fibrous filler (E) in an amount of 10 parts by mass or more and 400 parts by mass or less with respect to 100 parts by mass of the polyaryletherketone (A).

5. A fiber reinforced plastic base obtained by impregnating a continuous fibrous filler (E) or a reinforcing fiber base in which a discontinuous fibrous filler (E) is dispersed with the polyaryletherketone resin composition according to claim 1.

6. A molded article obtained by molding the polyaryletherketone resin composition according to claim 1.

7. The polyaryletherketone resin composition according to claim 2, further comprising: a fibrous filler (E) in an amount of 10 parts by mass or more and 400 parts by mass or less with respect to 100 parts by mass of the polyaryletherketone (A).

8. The polyaryletherketone resin composition according to claim 7, further comprising: a multivalent amine (D) in an amount of 0.01 parts by mass or more and 5 parts by mass or less with respect to 100 parts by mass of the polyaryletherketone (A).

9. The polyaryletherketone according to claim 1, wherein the resin composition has a transition metal content of 0.016 parts by mass or more and 1.6 parts by mass or less based on 100 parts by mass of the polyaryletherketone (A).

* * * * *